United States Patent [19]
Phillips et al.

[11] 4,300,932
[45] Nov. 17, 1981

[54] APPARATUS FOR FORMING MINERAL FIBERS

[75] Inventors: John D. Phillips, Newark, Ohio; William W. Schultz, Evanston, Ill.

[73] Assignee: Owens-Corning Fiberglas Corporation, Toledo, Ohio

[21] Appl. No.: 126,086

[22] Filed: Feb. 29, 1980

[51] Int. Cl.³ ............. C03B 37/04; C03B 37/07
[52] U.S. Cl. .................................... 65/14; 65/16
[58] Field of Search .................... 65/5, 6, 14, 16

[56] References Cited

U.S. PATENT DOCUMENTS

| | | | |
|---|---|---|---|
| 3,865,566 | 2/1975 | Kleist | 65/14 X |
| 4,246,017 | 1/1981 | Phillips | 65/8 |

FOREIGN PATENT DOCUMENTS

| | | | |
|---|---|---|---|
| 699977 | 12/1964 | Canada | 65/14 |
| 972326 | 1/1951 | France | 65/16 |
| 40-8052 | 4/1965 | Japan | 65/14 |

Primary Examiner—Robert L. Lindsay, Jr.
Attorney, Agent, or Firm—Ronald C. Hudgens; Philip R. Cloutier; Ted C. Gillespie

[57] ABSTRACT

A blower for discharging a gaseous flow to attenuate molten mineral material into mineral fibers comprises a body member and a cantilevered lid member mounted on the body member to define a gas supply manifold and a gas discharge slot. The free end of the lid member is biased toward the body member and a jackscrew is adapted to raise the free end of the lid member from the body member to adjust the slot width.

7 Claims, 3 Drawing Figures

APPARATUS FOR FORMING MINERAL FIBERS

TECHNICAL FIELD

This invention relates to forming fibers from molten mineral material, such as forming glass fibers from molten glass. In one of its more specific aspects, this invention relates to flowing molten mineral material through orifices in the peripheral wall of a spinner to form primary fibers, and further attenuating the primary fibers into secondary fibers by the action of a flow of gases from a blower.

BACKGROUND OF THE INVENTION

The common practice in forming fibers of mineral material is to pass the material in a molten state through the orifices of the peripheral wall of a centrifuge or spinner to create primary fibers. Thereafter, the primary fibers are further attenuated into a veil of secondary fibers of smaller diameter by the action of a flow of gases discharged downwardly from a blower. It is known in the prior art that such blowers can be annular in shape and can also be adapted to blow air, steam or other gases. The blowers of the prior art are commonly comprised of a concave body member and a cantilevered lid member mounted to the body member, where the free end of the cantilevered member is close to the body member to define a narrow slot for the discharge of gases from the blower.

One of the problems associated with the blowers of the fiber-forming devices of the prior art is that it is difficult to accurately control the width of the slot in the high temperature environment in which the blower must operate. The high operating temperatures have a tendency to deform the cantilevered lid member, thereby modifying the size and the shape of the slot. An attempt to solve this problem resulted in the use of shims inserted into the slot to maintain a minimum slot size in the event the free end of the cantilevered lid member deforms toward the body member. The use of such shims has been found to be unsatisfactory because it provides no control in cases where the deformation of the cantilevered lid member raises the free end away from the lid member. The shims have also been found to be unacceptable because of the difficulty of adjusting the slot size with the shims, and of the difficulty in maintenance. There is a need for a blower having a slot adjustment mechanism which is readily adjustable and easily cleanable, and which can provide accurate control of the blower slot during operation in a high temperature environment.

SUMMARY OF THE INVENTION

According to this invention, there is provided a blower for attenuating molten mineral material into mineral fibers comprising a body member and a lid member defining a gas supply manifold and a gas discharge slot, wherein the improvement comprises adjustment means adapted to raise and lower the lid member to control the size of the gas discharge slot.

In one embodiment of the invention, the lid member is biased with respect to the body member, and the adjustment means is adapted to oppose the bias to control the size of the slot.

In another embodiment of the invention, the lid member is biased toward the body member.

In a preferred embodiment of the invention, the adjustment means is a screw means adapted to raise the lid member away from the body member.

In the most preferred embodiment of the invention, the lid is cantilevered and the free end of the lid member is biased toward the body member, and a jackscrew is adapted to raise the free end from the body member.

In a specific embodiment of the invention, the body member and the lid member are annular, and there are a plurality of jackscrews.

In an additional embodiment, the lid member and body member define a straight line slot, and there are a plurality of jackscrews.

DESCRIPTION OF THE INVENTION

Figure 1:
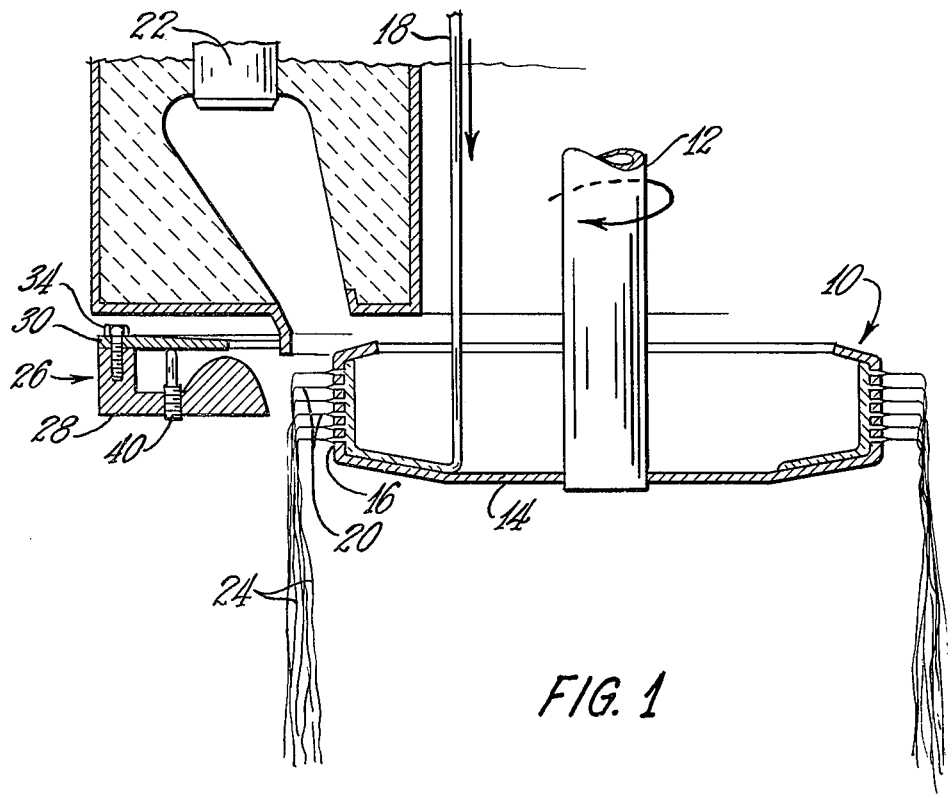
FIG. 1 is a schematic view in elevation of apparatus for forming mineral fibers according to the principles of this invention.
Figure 2:
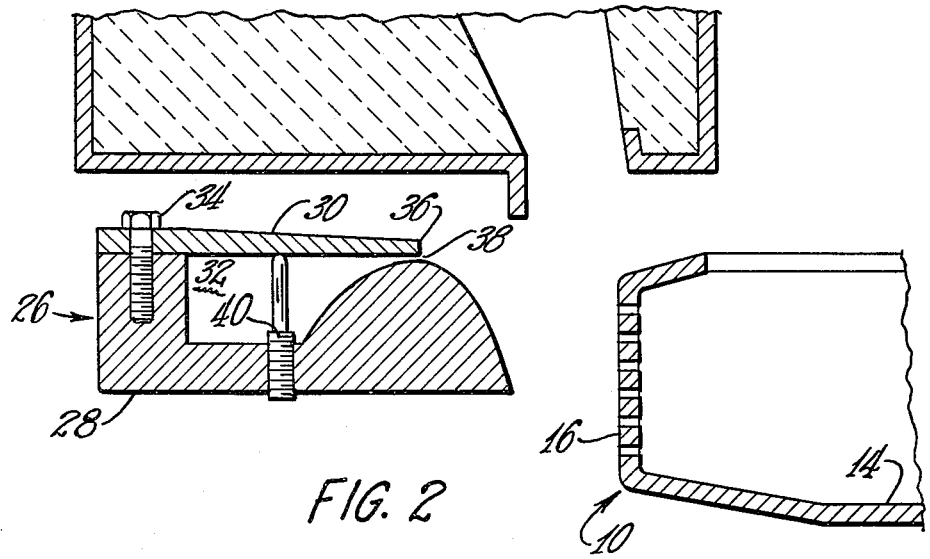
FIG. 2 is a schematic view in elevation of the blower of this invention.

As shown in FIGS. 1 and 2, spinner 10 is mounted for rotation on quill 12 and is comprised of spinner bottom wall 14 and orificed peripheral wall 16. Molten glass stream 18 drops into the bottom of the spinner and flows outwardly and upwardly to the spinner peripheral wall through which the glass passes to form primary fibers 20. The primary fibers can be maintained in a plastic, attenuable condition by the heat supplied from annular burner 22. The primary fibers are further attenuated into secondary fibers 24 by the action of a flow of gases discharged from annular blower 26. The flow of gases discharged from the blower can be air, steam, or any suitable combination of gases.

The blower is comprised of body member 28 and lid member 30. The body member is concave and the lid member is mounted on the body member to define manifold 32 for the supply of gases. Gases are supplied to the manifold from a source not shown. The lid member is cantilevered so that one end is mounted to the body member with bolts 34, and the free end 36 is positioned near the body member to define annular slot 38.

The blower is adapted so that the lid member is biased or prestressed in the direction of the body member. Thus, in the absence of any opposing force, the free end would actually be pressing against the body member, thereby closing off the slot. Jackscrew 40, which can be mounted to protrude from the body member into contact with the lid member, is adapted to force the lid member in a direction opposite from the bias force to raise the free end of the lid member away from the body member. It can be seen that the prestressed condition of the lid member forces the free end of the lid member downwardly, and the precise positioning of the jackscrew opposes the bias of the lid member and provides accurate control of the width of the slot. The jackscrew can be of the type which permits vertical movement relative to the body member upon rotation of the jackscrew. Thus, it can be seen that the combination of the biased, cantilevered lid member and the jackscrew adapted to oppose the bias comprises an adjustment means adapted to raise and lower the lid member to control the size of the gas discharge slot. It has been found that a slot width of 0.006 inches (0.15 mm)

±0.001 inches (0.025 mm) is effective to discharge gases to attenuate glass fibers.

Figure 3:
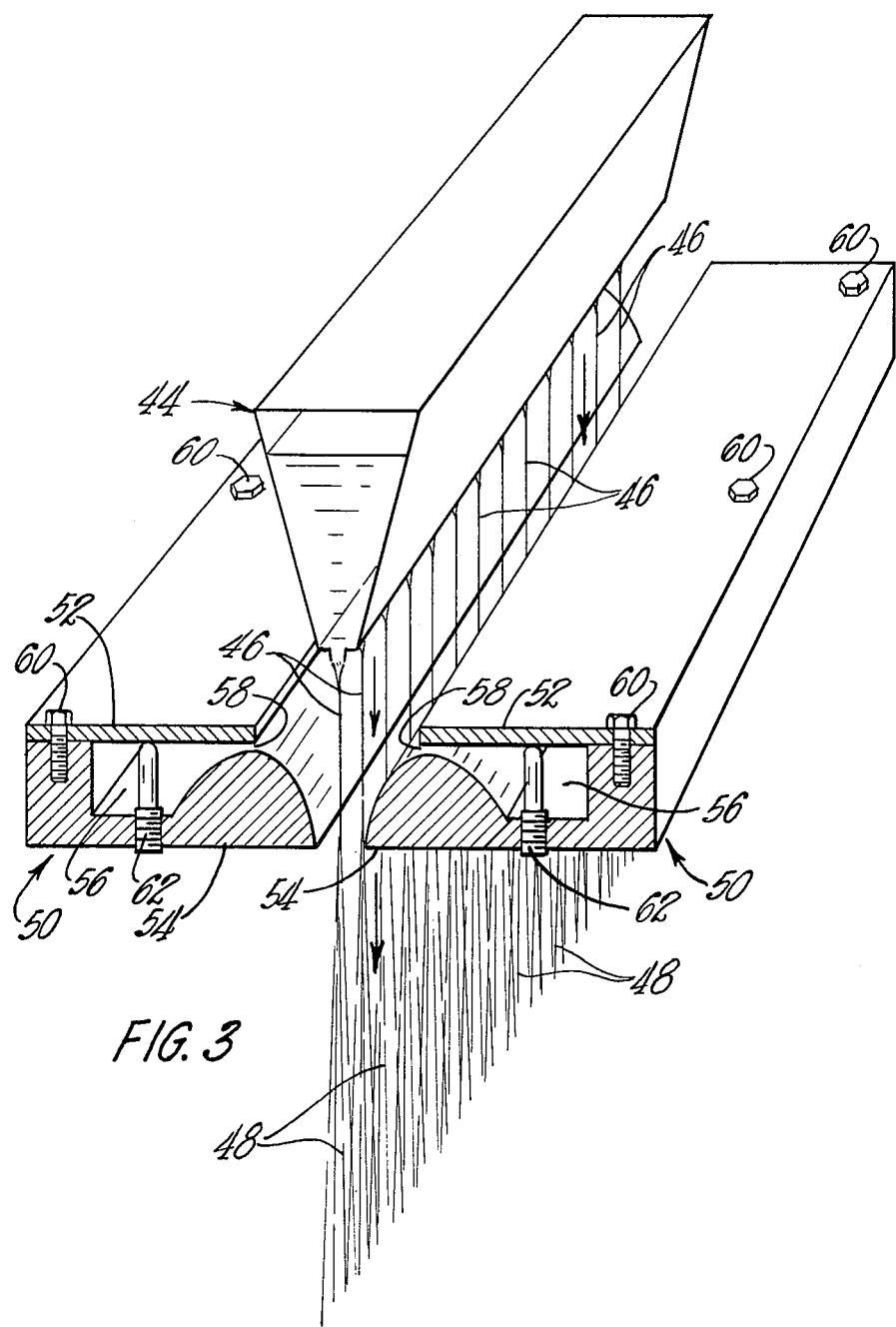
FIG. 3 is a schematic perspective view of a straight line embodiment of the blower according to the principles of this invention.

The embodiment shown in FIG. 3 illustrates that the blower slot adjustment can be accomplished with a straight line blower and slot attenuating a straight line array of fibers. As shown, bushing 44 discharges primary fibers 46 which are further attenuated into secondary fibers 48 by blowers 50. The blowers are comprised of lid members 52 and body members 54 defining manifolds 56 and straight line slots 58. The lid member is biased or prestressed by bolts 60. An opposing force is provided by plurality jackscrews 62 which act with the biased lid as an adjustment means to control the width of the slots.

EXPLOITATION IN INDUSTRY

This invention will be found to be useful in the formation of fibers from molten glass for such uses as glass fiber thermal insulation products and glass fiber acoustical insulation products.

We claim:

1. Apparatus for attenuating molten mineral material into mineral fibers comprising an orificed spinner for producing primary mineral fibers and a blower for further attenuating the primary mineral fibers into secondary mineral fibers, said blower comprising a body member and a lid member defining a gas supply manifold and a gas discharge slot, wherein the improvement comprises adjustment means adapted to raise and lower said lid member to control the size of said gas discharge slot.

2. The apparatus of claim 1 in which said lid member is biased with respect to said body member, and said adjustment means is adapted to oppose the bias to control the size of said slot.

3. The apparatus of claim 2 in which said lid member is biased toward said body member.

4. The apparatus of claim 3 in which said adjustment means is a screw means adapted to raise said lid member away from said body member.

5. Apparatus for attenuating molten mineral material into mineral fibers comprising an orificed spinner for producing primary mineral fibers and a blower for further attenuating the primary mineral fibers into secondary mineral fibers, said blower comprising a body member and a lid member defining a gas supply manifold and a gas discharge slot, wherein the improvement comprises the free end of said lid member being biased toward said body member, and further comprises a jackscrew adapted to raise said free end from said body member to control the size of said gas discharge slot.

6. The blower of claim 5 in which said body member and said lid member are annular, and further comprising a plurality of jackscrews.

7. The blower of claim 6 in which said body member and said lid member define a straight line slot, and further comprising a plurality of jackscrews.

* * * * *